(12) United States Patent
Otosaka (10) Patent No.: US 9,108,877 B2
(45) Date of Patent: Aug. 18, 2015

(54) GLASS BASE MATERIAL ELONGATION METHOD

(71) Applicant: Shin-Etsu Chemical Co., Ltd., Tokyo (JP)

(72) Inventor: Tetsuya Otosaka, Gunma (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 153 days.

(21) Appl. No.: 13/922,252

(22) Filed: Jun. 20, 2013

(65) Prior Publication Data

US 2014/0020430 A1    Jan. 23, 2014

(30) Foreign Application Priority Data

Jul. 18, 2012    (JP) .................................. 2012-159452

(51) Int. Cl.
*C03B 37/03*    (2006.01)
*C03B 37/012*    (2006.01)

(52) U.S. Cl.
CPC ........... *C03B 37/032* (2013.01); *C03B 37/0124* (2013.01); *C03B 37/0126* (2013.01)

(58) Field of Classification Search
None
See application file for complete search history.

(56) References Cited

U.S. PATENT DOCUMENTS

| 2001/0009104 A1* | 7/2001 | Wada et al. ..................... 65/407 |
| 2004/0000169 A1* | 1/2004 | Fagan et al. ..................... 65/108 |
| 2008/0013901 A1* | 1/2008 | Kim et al. ..................... 385/123 |
| 2012/0055199 A1* | 3/2012 | Shimizu ......................... 65/427 |

FOREIGN PATENT DOCUMENTS

| JP | H7-025636 A |   | 1/1995 |
| JP | 11199261 A | * | 7/1999 |
| JP | H11-199261 A |   | 7/1999 |
| JP | 2001-158626 A |   | 6/2001 |
| JP | 2011-116592 A |   | 6/2011 |
| JP | 2012-076990 A |   | 4/2012 |
| JP | 2010-059033 A |   | 3/2013 |
| WO | WO 2010026769 A1 * | 3/2010 |

OTHER PUBLICATIONS

Machine Translation of JP11-199261 performed on JPO website Jan. 8, 2015.*
English Translation of JP11-199261 performed by Schreiber Translations, Inc. Jan. 2015.*
Office Action issued for counterpart Japanese Application 2012-159452, issued by the Japanese Patent Office on Dec. 15, 2014.

* cited by examiner

*Primary Examiner* — Lisa Herring (57) ABSTRACT

Provided is a glass base material elongation method for elongating a glass base material with a large diameter to manufacture a glass rod with a smaller diameter, the method comprising, when elongating a glass base material that has a transparent glass tapered portion at one end of a trunk portion and a glass tapered portion including a non-transparent glass portion at the other end of the trunk portion, prior to the elongation, fusing a hanging dummy to an end of the transparent glass tapered portion, setting the hanging dummy in communication with a feeding mechanism, inserting the glass base material into a heating furnace beginning with the other end, and performing elongation.

9 Claims, 9 Drawing Sheets

GLASS BASE MATERIAL ELONGATION METHOD

The contents of the following Japanese patent application are incorporated herein by reference: No. 2012-159452 filed on Jul. 18, 2012.

BACKGROUND

1. Technical Field

The present invention relates to a glass base material elongation method in which the glass base material is heated and elongated into a glass rod with a smaller diameter.

2. Related Art

When manufacturing a quartz glass rod, which can be exemplified by an optical fiber preform, after manufacturing a glass base material in advance with a large diameter, an elongation apparatus including a heating furnace is used to elongate the glass base material and obtain a glass rod with a smaller diameter. The glass rod resulting from the elongation in the elongation apparatus has a relatively large outer diameter fluctuation of ±3%, for example. Therefore, the glass rod is again elongated with greater precision in an elongation apparatus using a burner, referred to as a glass lathe, as the heating source, thereby adjusting the glass rod to have outer diameter fluctuation of ±1% or less, which is desired for the product.

In recent years, when manufacturing optical fiber from an optical fiber preform, optical fiber manufactured from a larger optical fiber preform has the advantage of a greater capacity utilization rate. Therefore, an optical fiber preform is desired with an outer diameter greater than the conventional diameter of 80 mm, e.g. an optical fiber preform with a diameter of 120 mm or more. However, for a large preform with an outer diameter of 120 mm, the adjustment of the outer diameter with a glass lathe is difficult. This is because, since the heating by the burner is performed in the open air, cooling through radiation occurs at the same time as the heating, and the cooling effect by radiation increases along with the outer diameter, such that a sufficiently high temperature cannot be reached.

When processing with the glass lathe, proposals have been made to use a plurality of burners or cover the region around the heater with heat resistant material. However, using a plurality of burners greatly increases the amount of gas used, which is unfavorable when considering cost. Furthermore, with the method of covering the region around the heater with heat resistant material, foreign material peels away from the surface of the heat resistant material and attaches to the glass rod, which makes it difficult to maintain the desired surface cleanliness. The outer diameter fluctuation in a glass rod obtained from an elongation apparatus is desired to be restricted to within ±1%, which is desired for the product, or to a fluctuation near ±1%.

Figure 1:
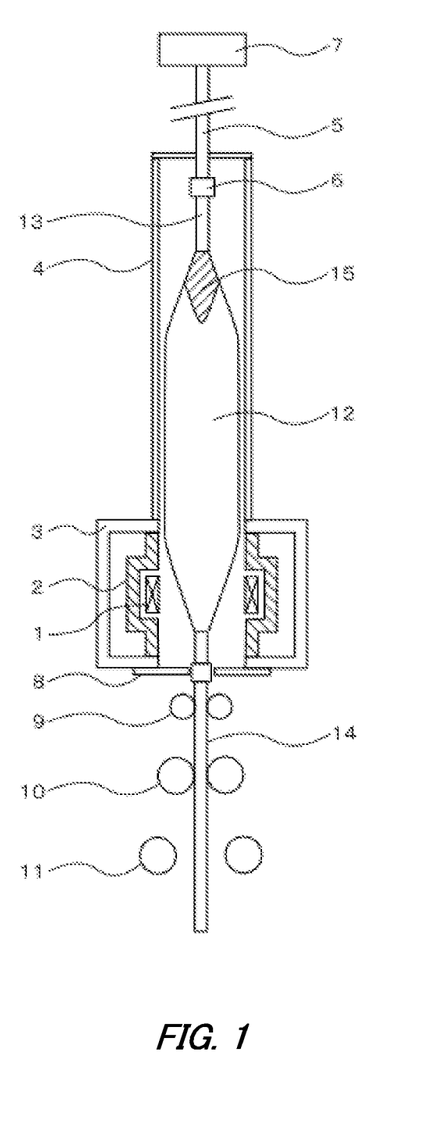
FIG. 1 is a schematic vertical cross-sectional view of an exemplary conventional elongation apparatus.

The following uses FIG. 1 to describe an example of an elongation apparatus used for conventional elongation. The elongation apparatus is formed by three major portions, which are the heating furnace, the feeding section, and the pulling section. The heating furnace includes a heater 1, a water-cooled chamber 3 housing a thermal insulator 2, a top chamber 4 connected to the top of the water-cooled chamber 3, and a lower gas seal 8 attached to the bottom of the water-cooled chamber 3. The feeding portion is formed by a feeding mechanism 7 capable of moving up and down and provided above the heating furnace, a hanging shaft 5 connected to the feeding mechanism 7, and a connecting jig 6. The hanging shaft 5 is inserted into the top chamber 4.

The pulling section is formed by a set of guide rollers 9 below the furnace that is capable of gripping and releasing, a set of upper pulling rollers 10, and a set of lower pulling rollers 11. The guide rollers 9 is formed by heat resistant rollers of carbon or the like, and serves to guide the pulling dummy 14 or glass rod to the center of the apparatus. The upper pulling rollers 10 and the lower pulling rollers 11 are driven by motors, and operate to suitably elongate the glass base material 12 by pulling down the pulling dummy 14 or glass rod gripped by the pulling rollers.

The top end of the hanging dummy 13 provided above the glass base material 12 connects mechanically to the connecting jig 6. In this way, the glass base material 12 is in communication with the feeding mechanism 7 through the hanging shaft 5. The pulling dummy 14 is connected to the bottom end of the glass base material 12. In the case of a glass base material 12 manufactured from a porous glass base material, there is a non-transparent portion 15 in a tapered portion at the top thereof. During elongation, while the glass base material 12 is being pulled down by the feeding mechanism 7, the pulling dummy 14 is pulled downward at a higher speed by the upper pulling rollers 10 and the lower pulling rollers 11, thereby obtaining a glass rod with a smaller diameter from the glass base material 12.

In recent years, in order to decrease the outer diameter variation of a glass rod formed by an elongation apparatus, a variety of techniques have been proposed. For example, Japanese Patent Application Publication No. 2012-076990 describes measuring the outer diameter before elongation, estimating the change in the shape within the heating furnace based on the change in the outer diameter, and accurately controlling the downward pulling speed to form a glass rod having restricted diameter fluctuation over the entire length thereof. Furthermore, Japanese Patent Application Publication No. 2011-116592 describes using a quartz glass rod in which the top chamber is a material with high transparency, enabling visible light and infrared light that propagates upward within the glass base material to efficiently escape to the outside, and preventing heat from being trapped in the tapered portion at the top of the glass base material to restrict the diameter fluctuation near the final portion to be elongated. Yet further, Japanese Patent Application Publication No. 2010-59033 describes using a glass base material manufactured from a porous glass base material and performing elongation such that the tapered portion including an unsintered non-transparent portion is at the bottom and the tapered portion that has already been completely transparently vitrified is at the top, thereby restricting diameter fluctuation near the final portion to be elongated.

With conventional elongation, as shown in FIG. 1, the arrangement of the glass base material is the same as the hanging direction during the process to transparently vitrify the porous glass base material, i.e. the glass base material is arranged such that the tapered portion including the non-transparent portion is at the top and the tapered portion that has already been completely transparently vitrified is at the bottom. In this case, the visible light and infrared light generated in the heated region of the glass base material and in the heating furnace propagate upward through the glass base material and are converted to heat in the non-transparent portion at the top, thereby causing the tapered portion at the top to have a higher temperature than the trunk portion. As a result, the tapered portion at the top is unintentionally stretched near the end of the elongation, which results in the feeding speed of the glass base material being substantially faster than the set speed and causes a greater outer diameter for the glass rod. In the method described in Japanese Patent Application Publication No. 2010-59033, the glass base material is hung with the opposite orientation during the transparent vitrification process and the entire tapered portion at the top is transparent glass, and therefore the light reaching the tapered portion at the top is efficiently released to the outside. In this way, localized temperature increase in the top tapered portion is prevented and the increase in the glass rod diameter near the final elongated portion is restricted.

However, there are two obvious problems with performing the elongation described in Japanese Patent Application Publication No. 2010-59033. The first problem is that after the transparent vitrification of the porous glass base material, when the resulting glass rod is hung upside down, if the tapered portion at the end hanging down is bent, the trunk portion of the hanging glass base material is not oriented straight downward. The bending of the tapered portion occurs when vitrification is performed without the core of the porous glass base material being at the center of the heating furnace during the transparent vitrification process of the porous glass base material.

Japanese Patent Application Publication No. 2001-158626 describes a solution that prevents the cause of the bending at the tip during transparent vitrification, and therefore also prevents the bending. In this way, when the core of the porous glass base material is not at the center of the heating furnace, temperature deviation occurs in the circumferential direction of the porous glass, causing a deviation in the contractive force in the circumferential direction of the porous glass that ultimately results in the bending and eccentricity.

In order to prevent this bending, the core position of the porous glass base material is adjusted to match the center of the furnace. In this way, the deviation in the temperature and contractive force in the circumferential direction of the porous glass base material is eliminated, and therefore the eccentricity and bending can be eliminated. With this method, the bending of the trunk of the base material can be sufficiently decreased, but it is difficult to completely eliminate the bending near the tip. This is because, when the region near the tip at the bottom is heated, there is no weight further below the portion being heated, and therefore deviation in the contractive force of the porous glass caused by even a small deviation in the temperature in the circumferential direction directly affects the bending. When heating the trunk portion, the weight of the tapered portion further below that has already been vitrified pulls downward, and therefore even if there is a small deviation in the contractive force, the force of the weight further blow acts to straighten the bending, and so it is more difficult for significant bending to occur when compared to the tip of the tapered portion.

If there is a bend on the lower-hanging side, this has a large impact on the elongation process. For example, if there is a bend with an angle of 0.2 degrees in the tapered portion of a glass base material with a length of 3000 mm and the side having this bend is oriented at the top when hung, the bottom end of the glass base material can be theoretically skewed from the center line of the hanging portion by up to 10 mm. When the technique for reducing bending described in Japanese Patent Application Publication No. 2001-158626 is not used, the variation in bending amount increases and can reach up to 3 degrees or more. Depending on the flexibility of the hanging portion, the actual skew amount from the center line of the hanging portion can be less than the theoretical value, but when there is such skew, the glass base material contacts the heating furnace and large bending stress is placed on the hanging portion, thereby increasing the risk of damage to the hanging shaft. Furthermore, since the glass base material is not hanging completely vertically, the bending in the glass rod is increased.

The method described in Japanese Patent Application Publication No. 2010-59033 includes, during the transparent vitrification process, causing a portion of the upper tip to remain as a non-transparent glass portion, and heating this non-transparent glass portion first by inverting the orientation when hanging the glass base material during elongation. The second problem is that, at the start of elongation, when heating the non-transparent glass portion, the non-transparent glass portion could crack or break. Pores in the porous portion of the non-transparent glass portion where the sintering has not significantly progressed are filled with air. As the vitrification proceeds from the surface while heating this portion, air becomes trapped inside and unable to escape, and then when the temperature is further increased, the trapped air expands and causes swelling or cracking in the non-transparent glass portion.

The present invention aims to provide an elongation method for a glass base material having a large diameter, and in particular a glass base material that has a transparent glass tapered portion at one end of the trunk portion, a glass tapered portion including a non-transparent glass portion at the other end of the trunk portion, and high outer-diameter precision.

SUMMARY

According to an aspect of the present invention, provided is a glass base material elongation method for elongating a glass base material with a large diameter to manufacture a glass rod with a smaller diameter, the method comprising, when elongating a glass base material that has a transparent glass tapered portion at one end of a trunk portion and a glass tapered portion including a non-transparent glass portion at the other end of the trunk portion, prior to the elongation, fusing a hanging dummy to an end of the transparent glass tapered portion, setting the hanging dummy in communication with a feeding mechanism, inserting the glass base material into a heating furnace beginning with the other end, and performing elongation.

DESCRIPTION OF EXEMPLARY EMBODIMENTS

Hereinafter, an embodiment of the present invention will be described. The embodiment does not limit the invention according to the claims, and all the combinations of the features described in the embodiment are not necessarily essential to means provided by aspects of the invention.

The glass base material elongation method shown in the present embodiment is a method for manufacturing a glass rod with a smaller diameter by elongating a glass base material with a larger diameter. With this method, when elongating a glass base material that has a transparent glass tapered portion at one end of the trunk portion and a glass tapered portion including a non-transparent glass portion at the other end of the trunk portion, the hanging dummy is fused to the tip of the transparent glass tapered portion prior to elongation, the hanging dummy is connected to the feeding mechanism, and the resulting member is inserted into the heating furnace from the other end of the glass base material. In this way, the axial core of the trunk portion of the glass base material can be matched to the axial core of the hanging dummy, and the vertical orientation of the trunk portion of the glass base material when hung can be ensured.

The hanging dummy, when fused is connected such that the axial core of the hanging dummy matches the axial core of the glass base material trunk portion, and the pulling dummy, which is connected to the pulling mechanism of the elongation apparatus, is connected by fusion to a cleaved surface formed by cleaving a portion of the glass tapered portion that includes a non-transparent glass portion. The cleaved surface is preferably cleaved in a portion where there are no continuous bubbles remaining, for the following reasons. Small bubbles are present in the non-transparent glass portion, but these bubbles can be classified into two types, which are bubbles that are independent from each other and bubbles connected to each other to form continuous bubbles. The gas, which usually contains helium or halogen, in the environment used during the transparent vitrification of the porous glass base material is trapped in the independent bubbles, but when lowered from the sintering temperature to room temperature, no gas is newly supplied into these bubbles, and the pressure within the bubbles is lower than the atmospheric pressure by the amount of the temperature drop. On the other hand, since continuous bubbles are linked to the atmosphere, the internal pressure becomes equal to the atmospheric pressure.

Therefore, even when the independent bubble portions are reheated in the elongation process, since the internal pressure is negative from the start, swelling observable at the macro level is not observed. On the other hand, in the case of continuous bubbles, even if the surface were softened and sealed during the initial heating, the bubbles at atmospheric pressure trapped therein swell when heated. The determination as to whether the bubbles of the non-transparent portion in the cleaved surface are independent bubbles can be made by staining the surface with ink and then cleaving in the axial direction. In the case of independent bubbles, color appears only at the surface, but in the case of continuous bubbles, the ink penetrates to the inside. Since examination of each glass base material that has be transparently vitrified requires effort, a longitudinal position at which there are no continuous bubbles can be detected in advance by this ink staining test, and therefore the effort of the examination can be omitted during the normal process by cleaving the same position.

Next, the relationship between the outer diameter fluctuation and the cleaving position in the tapered portion including the non-transparent glass portion was examined. Specifically, four glass base material each having a length of 1800 mm and a trunk diameter of 180 mm were cleaved at four types of positions resulting in the tapered portion including the non-transparent glass portion having a diameter $D1$ of 108 mm, 120 mm, 132 mm, and 144 mm, respectively, and these glass base materials were fused to the pulling dummy and then elongated to a target diameter $Dr$ of 120 mm. From the results, it is understood that in a range of $D1 \leq 132$ mm ($=1.1Dr$), there is no effect on the outer diameter fluctuation of the side of the trunk portion at which elongation was begun. On the other hand, at $D1=144$ mm, hunching is observed in the outer diameter of the elongated glass rod effective portion, and the yield of the glass rod is 2% worse than when $D1 \leq 1.1Dr$. Accordingly, the relationship between the outer diameter $D1$ of the cleaved surface and the elongation target diameter $Dr$ of the elongation process preferably fulfills the condition of $D1 \leq 1.1Dr$, in order to restrict the outer diameter fluctuation in the side at which elongation is begun.

Depending on the conditions of the glass base material manufacturing process, if the cleaving results in a range of $D1 \leq 1.1Dr$, there are sometimes cases where continuous bubbles remain in the cleaved surface. Even when the cleaving results in a range of $D1 \leq 1.1Dr$, it is preferable to set conditions for the transparent vitrification process such that continuous bubbles do not remain in the cleaved surface. If continuous bubbles remain in the cleaved surface, an additional vitrification process can be performed while allowing the air in the continuous bubbles to escape, by setting the cleaved surface of the glass base material to be lower than the center of the heater 1 and slowly raising the glass base material while heating to a temperature from 1800° C. to 2200° C., for example. In this way, a glass rod with little diameter fluctuation can be obtained, without swelling or cracking of the non-transparent glass portion.

The pulling dummy is preferably connected through fusion to the bottom end of the glass base material. The pulling dummy can be connected mechanically, but connection by fusion is preferable to realize a stronger connection without instability caused by gaps. If there is any such instability in the connection, the pulling direction of the pulling dummy becomes unstable and bending of the elongated glass rod is increased. When fusing the pulling dummy to the cleaved surface, the non-transparent glass portion is preferably heated such that vitrification progresses. This is because, when heating the non-transparent glass portion, if heating from the surface of the non-transparent glass portion including air, the surface is vitrified and air remaining therein expands, and therefore there is the possibility that the non-transparent glass portion will swell or crack. If the non-transparent glass portion swells, mechanical damage is suffered in the furnace and the fusion connection cannot be correctly realized, for example.

When performing direct fusion without having vitrification progress in the cleaved surface of the non-transparent glass portion and the resulting member is then removed from the furnace such that the temperature drops rapidly, damage is experienced due to thermal stress. It is not necessary for the non-transparent glass portion to be made completely transparent, but damage from thermal stress can be avoided by heating the non-transparent glass portion to a temperature of 1800° C. to 2200° C. prior to the fusion connection, such that at least the surface portion is vitrified. The fusion connection of the pulling dummy is preferably performed within the heating furnace of the elongation apparatus. It is also possible to perform the fusion connection prior to setting the glass base material in the elongation apparatus. However, in this case, the total length of the workpiece resulting from the combination of the hanging dummy, the glass base material, and the pulling dummy can be excessive, which makes it difficult to ensure the ceiling height and space necessary for handling the workpiece.

Figure 6:
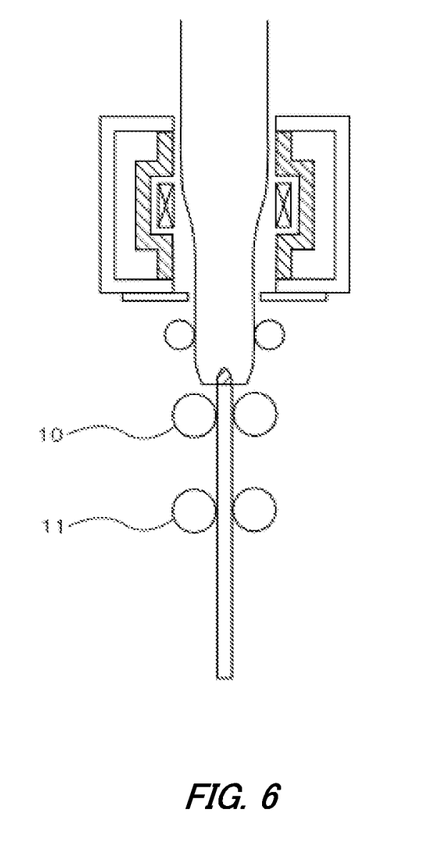
FIG. 6 shows a state in which the elongation of the glass base material has proceeded to the upper pulling rollers.
Figure 7:
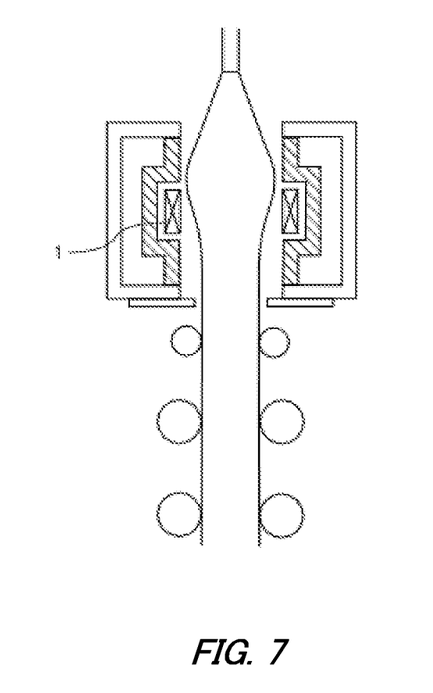
FIG. 7 shows a state near the end of the elongation.
Figure 8:
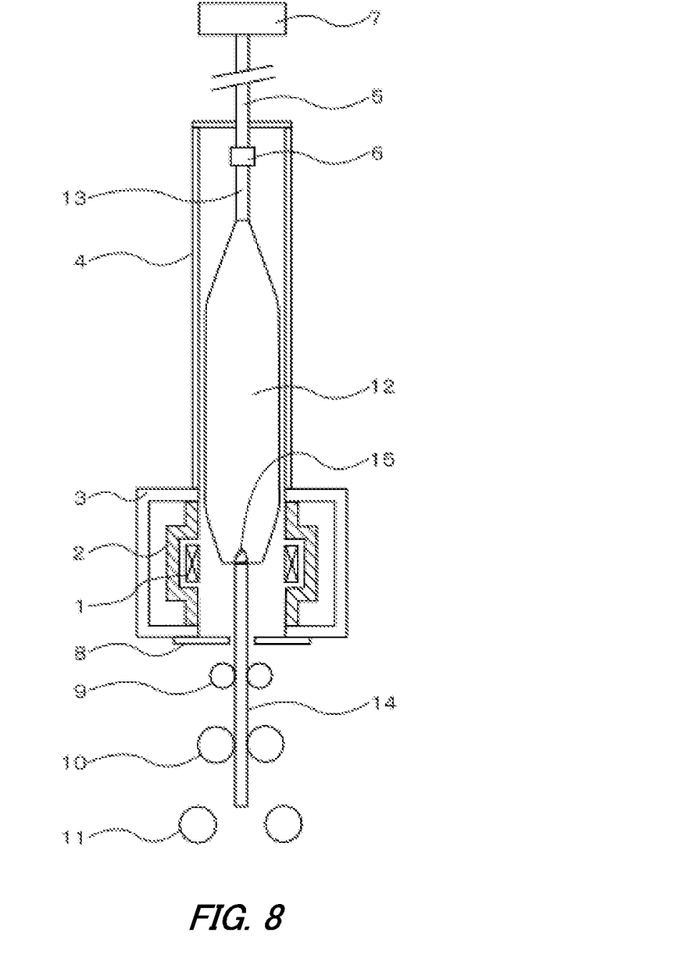
FIG. 8 shows the overall elongation apparatus at the stage shown in FIG. 3.
Figure 9:
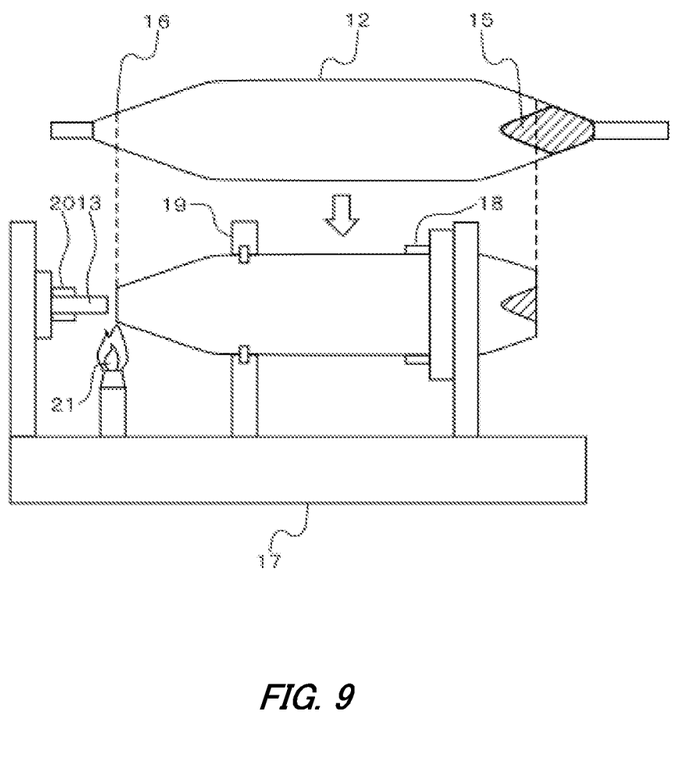
FIG. 9 is a schematic view for describing the pre-processing of the glass base material before beginning the elongation.

The following uses FIGS. 2 to 9 to provide a detailed description of the elongation process according to the present invention. FIGS. 2 to 7 show the process of the elongation method according to the present embodiment, and FIG. 8 shows the overall elongation apparatus at the stage shown in FIG. 3. FIG. 9 is a schematic view for describing the pre-processing of the glass base material before beginning the elongation process. In FIGS. 2 to 7, components around the feeding mechanism and the top chamber are omitted.

First, the pre-processing of the glass base material prior to the elongation process will be described using FIG. 9. The transparent glass portion tip 16 of the glass base material 12 is cleaved by using a dry or wet diamond saw, for example. The tapered portion on the side including the non-transparent portion 15 is cleaved at a portion where the outer diameter is approximately equal to the elongation diameter.

The trunk portion of the glass base material 12 cleaved at both ends in this manner is gripped by the centering rollers 19 and the tail-stock-side chuck 18 of the glass lathe 17. The tail-stock-side chuck 18 and the centering rollers 19 have rotational axes that are adjusted in advance. Therefore, simply by gripping the trunk portion of the glass base material 12, the axial core of the glass base material trunk portion is matched to the rotational axes of the glass lathe. The headstock-side chuck 20 grips the hanging dummy 13, the tip of the hanging dummy 13 and the transparent glass portion tip 16 of the glass base material 12 are heated and softened by the oxyhydrogen flame 21, and fusion is performed while the axial core of the hanging dummy 13 matches the axial core of the trunk portion. The hanging dummy 13 may be provided with protrusions, holes, or notches necessary for feeding and connection to the hanging shaft. The glass base material 12 prepared in this manner is connected to the feeding mechanism of the elongation apparatus by the fused hanging dummy 13, and hangs downward.

Figure 2:
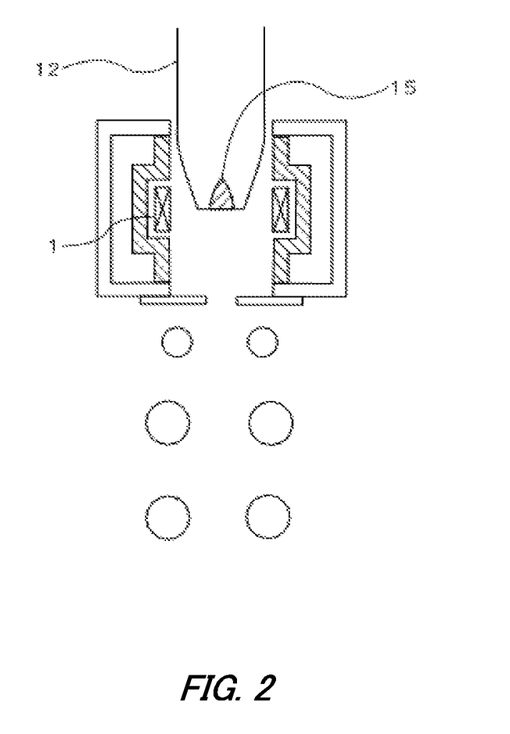
FIG. 2 shows a state in which the glass base material is set in the elongation apparatus.

Next, the elongation process is described using FIGS. 2 to 7. FIG. 2 shows a state in which the glass base material 12 is set in the elongation apparatus. The glass base material 12 is set such that the bottom end thereof comes to the center of the heater 1. In this state, the heater 1 is raised to a temperature approximately from 1800° C. to 2200° C., and the bottom end of the glass base material 12 is softened as the vitrification of the non-transparent portion 15 in the lower tapered portion progresses. At this time, a temperature increase rate of 30° C. to 60° C. per minute is suitable. If the temperature increase rate is too high, the temperature difference between the surface and the internal portion of the glass is large, and this leads to outer diameter fluctuation in the following elongation process. If the temperature increase rate is too low, the processing takes too long, and this is not good for mass production.

If there are continuous bubbles remaining in the cleaved surface, the set position for the bottom end of the glass base material 12 may be lower than the center of the heater 1 and the glass base material 12 may be heated while being slowly raised. If heating progresses from the bottom end surface when continuous bubbles remain in the non-transparent glass portion, the continuous bubbles are trapped in the fused bottom end surface, and the gas in the bubbles expands when the glass base material 12 is again heated, which causes swelling in the non-transparent portion that can negatively affect the later processing. However, by heating the bottom end surface from above, the gas in the continuous bubbles can slowly escape from the bottom without becoming trapped, and therefore swelling does not occur.

Figure 3:
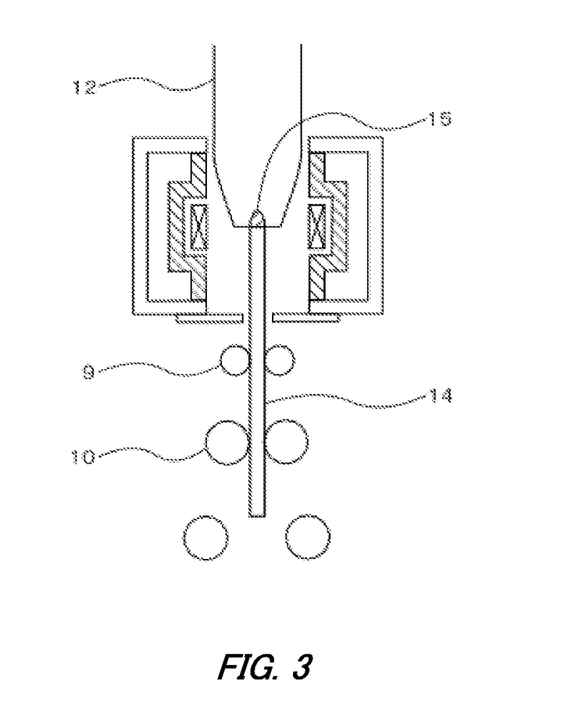
FIG. 3 shows a state in which the pulling dummy has been fused to the glass base material.

FIG. 3 shows a state in which the pulling dummy 14 has been fused to the glass base material 12. The pulling dummy 14 made of quartz glass is gripped by the guide rollers 9 and the upper pulling rollers 10, raised by driving of the pulling rollers, and fused to the bottom end of the glass base material 12. At this time, the non-transparent portion 15 is smaller than before the temperature was raised and vitrification has progressed particularly in the bottom end surface thereof, and therefore the pulling dummy 14 can be easily and firmly fused. After the pulling dummy 14 is fused, elongation is performed by lowering the glass base material 12 with the feeding mechanism while driving the upper pulling rollers 10 to lower the pulling dummy 14.

Figure 4:
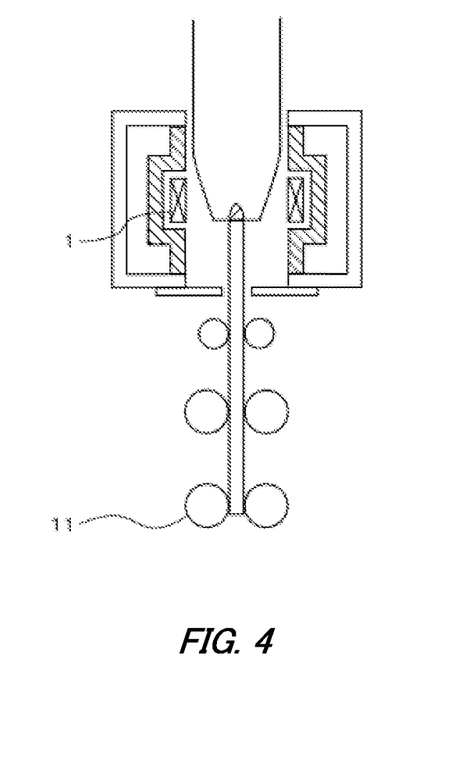
FIG. 4 shows a state in which the glass base material diameter at the height of the central portion of the heater 1 is the elongation target diameter.

FIG. 4 shows a state in which the glass base material diameter at the height of the central portion of the heater 1 is the elongation target diameter. The glass base material diameter at the height of the central portion of the heater 1 is exactly the elongation target diameter, and the substantial elongation is begun. When the lower pulling rollers 11 becomes able to grasp the pulling dummy 14, the lower pulling rollers 11 is closed and elongation is performed using both the lower pulling rollers 11 and the upper pulling rollers 10.

Figure 5:
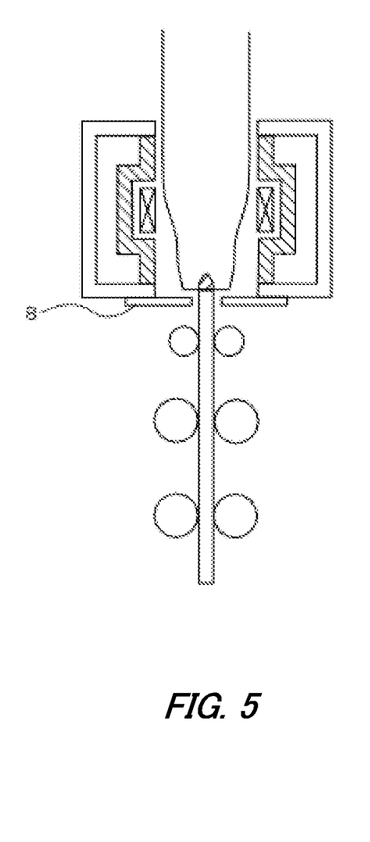
FIG. 5 shows a state in which the elongation of the glass base material has reached the lower gas seal.

FIG. 5 shows a state in which the elongation of the glass base material 12 has reached the lower gas seal 8. When the point of elongation shown in FIG. 5 is reached, the lower gas seal 8 is opened and the elongated glass rod is moved outside the heating furnace.

FIG. 6 shows a state in which the elongation of the glass base material 12 has proceeded to the upper pulling rollers 10. Upon reaching the state shown in FIG. 6, the upper pulling rollers 10 can no longer be used for elongation, and therefore the upper pulling rollers 10 is opened and elongation proceeds using only the lower pulling rollers 11. After this, elongation proceeds while the upper pulling rollers 10 and the lower pulling rollers 11 each open and then close.

FIG. 7 shows a state near the end of the elongation. Near the end of the elongation, the upper glass tapered portion is near the heater 1, as shown in FIG. 7. This glass tapered portion is significantly heated by the visible light and infrared light moving upward from the portion heated during elongation, but the temperature does not reach a high temperature from hundreds to thousands of degrees Celsius such as in a case where there is a non-transparent glass portion at the top. Therefore, the fattening of the glass rod in this portion caused by extension of the tapered portion can be kept to a minimum. FIG. 8 shows an example of a pulling method using rollers, but other known methods may be used, such as a pulling method in which the pulling dummy is directly gripped by a pulling chuck moving vertically or a pulling method in which the pulling rollers are replaced with pulling heat resistant rubber belts.

Embodiment

One hundred pieces of glass base material in which the trunk portion has a length of 1800 mm, the tapered portions at each end have a length of 500 mm, and the trunk portion has an outer diameter of 180 mm were elongated under a condition that the elongation target diameter Dr is 120 mm. The tapered portion including the non-transparent glass portion was cleaved at a position where the outer diameter of the cleaved surface portion is in a range of $115 \text{ mm} \leq D1 \leq 132 \text{ mm}$ and where the non-transparent glass portion of cleaved surface does not contain continuous bubbles. The transparent glass tapered portion side that does not include the non-transparent glass portion was severed at a position where the outer diameter of the tip is 80 mm, and connected to the hanging dummy with an outer diameter of 40 mm at the cleaved surface. This connection was performed by using the glass lathe shown in FIG. 9 to fuse the hanging dummy to the cleaved surface such that the central axis of the glass base material trunk portion matches the central axis of the hanging dummy.

The elongation apparatus shown in FIG. 8 was used, and a quartz glass object was used in the top chamber 4. The glass base material was set in the elongation apparatus such that the transparent glass side was on top and the side including the non-transparent glass portion was on the bottom. As shown in FIG. 2, the bottom end of the glass base material was set to the same height as the center of the heater 1, the temperature was raised from room temperature to 2100° C. at a rate of 40° C. per minute, the pulling dummy 14 was then fused, and elongation was performed. During the initial heating, no cracking or swelling was observed in the glass base material, and the fattening of the glass rod near the end of elongation was in a range of +0.2 mm to +1.1 mm (average of 0.7 mm) from the target elongation diameter. Glass rods were obtained in which the total elongated length was approximately 4000 mm, and each of these was cleaved in half to obtain glass rods of approximately 2000 mm. The ends of each glass rod resulting from the cleaving were mounted on respective V-blocks and rotated, and the maximum dislocation of the glass rod between the V-blocks during rotation was measured as the bending, which showed favorable values from 0.3 mm to 1.8 mm (average of 0.9 mm).

Comparative Example

One hundred pieces of glass base material in which the trunk portion has a length of 1800 mm, the tapered portions at each end have a length of 500 mm, and the trunk portion has an outer diameter of 180 mm were elongated under a condition that the elongation target diameter Dr is 120 mm. In contrast to the above embodiment, the ends of the dummy sections were used as-is in the state prior to the transparent vitrification process, and the pulling dummy was mechanically connected to the bottom end of the glass base material. When the glass base material was hung, five of the glass base material pieces had their bottom ends skewed too far from the center of the heating furnace, and could not be set in the elongation apparatus. Furthermore, during the initial heating, cracking or swelling occurred in eight of the glass base material pieces. Fattening of the glass rod near the end of the elongation was in a range of +0.2 mm to +1.3 mm (average of 0.7 mm) from the target elongation diameter. Glass rods were obtained in which the total elongated length was approximately 4000 mm, and each of these were cleaved in half to obtain glass rods of approximately 2000 mm. The ends of each glass rod resulting from the cleaving were mounted on respective V-blocks and rotated, and the maximum dislocation of the glass rod between the V-blocks during rotation was measured as the bending, which showed values from 0.8 mm to 4.5 mm (average of 2.2 mm), which was approximately 2.4 times the average value obtained from the above embodiment.

As described above, with the embodiment of the present invention, by newly connecting the hanging dummy prior to elongation, the axial core of the glass base material trunk portion can be matched to the axial core of the hanging dummy, the vertical orientation of the glass base material trunk portion when hung can be ensured, and a glass rod can be obtained with high outer diameter precision. Furthermore, since the region around the heating portion is not covered by a heat resistant material, foreign material does not peel off of the surface of the heat resistant material to become stuck to the glass rod, and therefore a glass rod with high surface cleanliness can be obtained.

While the embodiment of the present invention has been described, the technical scope of the invention is not limited to the above described embodiment. It is apparent to persons skilled in the art that various alterations and improvements can be added to the above-described embodiment. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

What is claimed is:

1. A glass base material elongation method for elongating a glass base material with a large diameter to manufacture a glass rod with a smaller diameter, the glass base material having a transparent glass tapered portion at one end of a trunk portion and a glass tapered portion including a non-transparent glass portion at another end of the trunk portion, the method comprising:
   prior to the elongation, fusing a hanging dummy to an end of the transparent glass tapered portion, setting the hanging dummy in communication with a feeding mechanism, and inserting the glass base material into a heating furnace beginning with the another end; and
   performing the elongation, wherein
   said performing the elongation includes positioning the another end lower than the center of the heating furnace, heating the glass base material while raising the glass base material so as to heat the another end from above, and, thereafter, heating the glass base material while lowering the glass base material.

2. The glass base material elongation method according to claim 1, wherein
   when fusing the hanging dummy, connection is made such that an axial core of the hanging dummy matches an axial core of the glass base material trunk portion.

3. The glass base material elongation method according to claim 1, further comprising:
   cleaving a portion of the glass tapered portion including the non-transparent glass portion; and
   fusing a pulling dummy connected to a pulling mechanism of an elongation apparatus to the cleaved surface.

4. The glass base material elongation method according to claim 3, wherein
   the cleaved surface is formed by cleaving at a portion where no continuous bubbles remain.

5. The glass base material elongation method according to claim 3, further comprising
   prior to said cleaving, detecting a longitudinal position that does not include continuous bubbles in a test glass base material, wherein
   the portion cleaved in said cleaving corresponds to the detected longitudinal position in the test glass base material.

6. The glass base material elongation method according to claim 3, wherein
   a relationship between an outer diameter D1 at the cleaved surface and an elongation target diameter Dr is such that $D1 \leq 1.1 Dr$.

7. The glass base material elongation method according to claim 3, further comprising,
   when fusing the pulling dummy to the cleaved surface to create a connection, heating the non-transparent glass portion such that vitrification progresses therein.

8. The glass base material elongation method according to claim 3, wherein
   the connection of the pulling dummy via fusion is performed in the heating furnace.

9. The glass base material elongation method according to claim 5, wherein
   said detecting includes staining a surface of the test glass base material and cleaving the test glass base material in an axial direction.

\* \* \* \* \*